United States Patent
Coleman et al.

(10) Patent No.: US 12,152,809 B2
(45) Date of Patent: Nov. 26, 2024

(54) SOLAR TABLE CLAMP

(71) Applicant: Terabase Energy, Inc., Berkeley, CA (US)

(72) Inventors: Brian Coleman, Portland, OR (US); Adam Hansel, Davis, CA (US); Soren Jensen, Corte Madera, CA (US)

(73) Assignee: Terabase Energy, Inc., Berkeley, CA (US)

( * ) Notice: Subject to any disclaimer, the term of this patent is extended or adjusted under 35 U.S.C. 154(b) by 162 days.

(21) Appl. No.: 17/887,519

(22) Filed: Aug. 15, 2022

(65) Prior Publication Data

US 2024/0053061 A1    Feb. 15, 2024

(51) Int. Cl.
*F24S 25/12*    (2018.01)
*H02S 20/10*    (2014.01)

(52) U.S. Cl.
CPC .............. *F24S 25/12* (2018.05); *H02S 20/10* (2014.12)

(58) Field of Classification Search
None
See application file for complete search history.

(56) References Cited

U.S. PATENT DOCUMENTS

| | | | |
|---|---|---|---|
| 2015/0092383 A1 | 4/2015 | Corio et al. | |
| 2015/0200621 A1 | 7/2015 | Reed et al. | |
| 2016/0365827 A1* | 12/2016 | Au | F16B 5/0664 |
| 2020/0076360 A1* | 3/2020 | Watson | H02S 20/30 |
| 2020/0153382 A1* | 5/2020 | Ballentine | F24S 25/636 |
| 2021/0180832 A1 | 6/2021 | Schuknecht et al. | |
| 2022/0193927 A1* | 6/2022 | Mazzetti, Jr. | B25J 9/1697 |
| 2022/0271706 A1* | 8/2022 | Creasy | H02S 30/10 |
| 2023/0246589 A1* | 8/2023 | Morankar | H02S 30/10 248/475.1 |
| 2023/0402963 A1* | 12/2023 | Yadlapalli | F24S 25/63 |
| 2024/0183473 A1* | 6/2024 | Charles | F16L 55/035 |

OTHER PUBLICATIONS

International Search Report and Written Opinion of the International Searching Authority mailed Aug. 30, 2023 in related PCT application No. PCT/US23/19872, (11 pgs).

* cited by examiner

*Primary Examiner* — Daniel P Malley, Jr.
(74) *Attorney, Agent, or Firm* — North Weber & Baugh; Michael North

(57) ABSTRACT

A clamp is described that couples a torque tube and at least one solar panel within a solar table. The clamp provides an efficient attachment when in a closed position that allows transportation of the solar table from a centralized assembly location to an installation point within a large-scale solar system. The clamp further provides an efficient process solar table mobile transport is described that moves a solar table to a point of installation. The clamp may be efficiently opened by personnel at the installation point to enable access to a section of the torque tube.

15 Claims, 14 Drawing Sheets

SOLAR TABLE CLAMP

STATEMENT REGARDING FEDERALLY SPONSORED RESEARCH OR DEVELOPMENT

This invention was made with government support under DE-EE0009012 awarded by the U.S. Department of Energy. The government has certain rights in the invention.

TECHNICAL FIELD

The present disclosure relates generally to various embodiments of clamps that secure a solar panel to a torque tube within a solar table to facilitate transport from a centralized assembly location to an installation point within a large-scale solar system. More particularly, the present disclosure relates to embodiments of clamps that provides a sufficient attachment between the solar panel and the torque tube to allow safe transport to the installation point while still allowing efficient removal of the clamp after the solar table arrives at the remote installation point.

BACKGROUND

The importance of solar power systems is well understood by one of skill in the art. Government agencies and companies are scaling the size and number of solar solutions within their energy infrastructure. This transition from traditional fossil fuel energy systems to solar energy solutions presents several challenges. One challenge is cost-effective management of the construction process and the ability to efficiently move components around the site during the construction process.

Large-scale solar panel systems typically include thousands of solar panels that are located across a multi-acre terrain and that are electrically coupled to provide a source of energy. These large-scale systems are oftentimes located in remote areas and require a significant investment in materials, resources and labor in their installation and design. The sourcing and delivery of materials and resources for these installations can be problematic and inconsistent. A further complication is the reliable and safe movement of these materials and resources across large areas of the construction site as well as maintaining consistent installation processes at each point of installation within the site. These issues further contribute to an increase in the cost and complexity of what is already a very cost-sensitive process.

FIG. 1 illustrates a typical prior-art installation process for solar systems. This prior-art installation process is implemented such that all mounting equipment for each solar panel is individually assembled and installed at its location within the larger system. The cost-effectiveness of this approach works fine within smaller solar deployments but struggles to cost-effectively scale to large solar systems as described below.

This traditional deployment 101 relies on materials being delivered to a deployment site via an access road. The materials are then processed and staged at the deployment site by a crew. A small portion of this delivered material is then moved by heavy equipment to a specific location where a solar panel and mounting equipment are assembled and installed at that location 102. The assembly process requires that solar tables are integrated within the system by connecting torque tubes using heavy-duty bolts and other components that secure the torque tubes together for multiple years. This process of attaching torque tubes together for long-term deployment is often time-consuming and requires access to certain portions of a torque tube so that these bolts may be properly inserted into the tubes. In prior art systems, solar panels are subsequently attached to the connected torque tube to complete the installation of the solar table. Because torque tubes are connected prior to attaching solar panels, personnel have unfettered access to the torque tubes when they are initially connected. The step is then repeated for an adjacent location 103 where materials are subsequently delivered, assembled and installed for a neighboring solar table within the system. While this approach may be effectively deployed in the installation of smaller solar systems, it becomes cost-prohibitive as the size of the system increases.

What is needed are systems, devices and methods that reduce the complexity and cost of the installation of large-scale solar panel systems.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that the description is not intended to limit the scope of the invention to these particular embodiments. Items in the figures may be not to scale.

FIGURE ("FIG.") 1 shows a prior art assembly and installation process of large-scale solar panel systems.

DETAILED DESCRIPTION OF EMBODIMENTS

Figure 1:
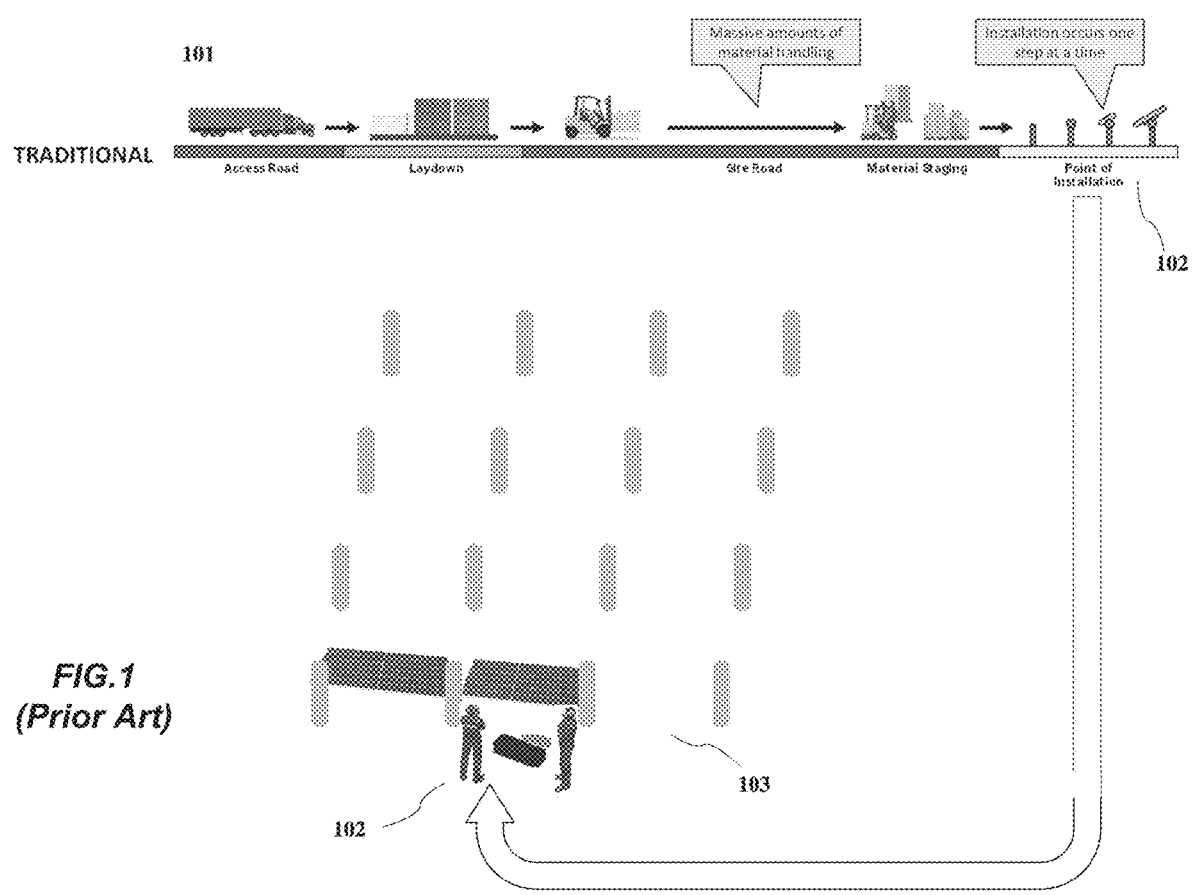

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in a variety of structures facilitating the transportation of assembled solar tables and subsequent integration within large-scale solar systems.

Furthermore, connectivity between components or systems within the figures are not intended to be limited to direct connections. Rather, connections between these components may be modified, or otherwise changed by intermediary components. Also, components may be integrated together or be discrete within the solar table clamp.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A component, function, or structure is not limited to a single component, function, or structure; usage of these terms may refer to a grouping of related components, functions, or structures, which may be integrated and/or discrete.

Further, it shall be noted that: (1) certain components or functionals may be optional; (2) components or functions may not be limited to the specific description set forth herein; (3) certain components or functions may be assembled/combined differently across different solar table mobile transports; and (4) certain functions may be performed concurrently or in sequence.

Furthermore, it shall be noted that many embodiments described herein are given in the context of the assembly and installation of large numbers of solar tables within a system, but one skilled in the art shall recognize that the teachings of the present disclosure may apply to other large and complex construction sites in which solar tables are transported and installed within the system. Additionally, embodiments of a solar table clamp may be implemented in smaller construction sites.

In this document, "large-scale solar system" refers to a solar system having 1000 or more solar panels. The term "clamp" refers to an attachment device that couples to a solar panel and/or rail and a torque tube to facilitate transportation of a corresponding solar table from a centralized assembly location to an installation point within a large-scale solar system. The word "personnel" refers to any laborer, worker, designer or individual employed to construct or install a solar table or solar system. The term "solar table" refers to a structural assembly comprising a torque tube and/or purlins with module rails. Some types of solar tables may have supplemental structure that allows it to connect to foundations/piles while other types do not have this supplemental structure. A solar table may have (but is not required) solar panels and/or electrical harnesses. The term "solar table mobile transport" (hereinafter, "mobile transport") describes a vehicle used to move a solar table to an installation site and facilitate an installation process of the solar table. A mobile transport may be driven by personnel, controlled by remote control or move autonomously within at least a portion of a solar system construction site. The term "rail" means a structural component that supports components, such as glass, within a solar panel, examples of which include solar panel frames, solar panel rails and stiffeners.

Figure 2:
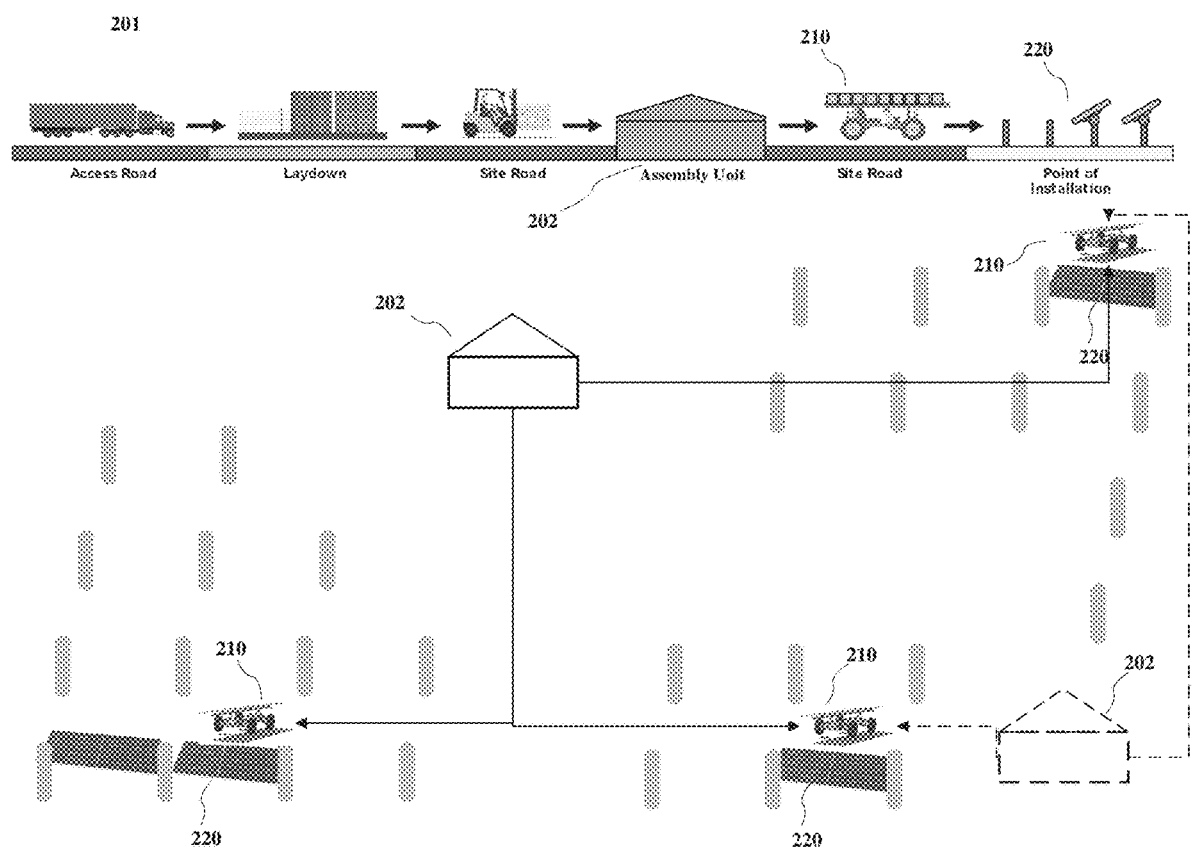
FIG. 2 is a diagram showing a centralized assembly and installation of a solar system including mobile transport of solar tables in accordance with various embodiments of the invention.

FIG. 2 provides an overview of a centralized solar table assembly and installation for large-scale solar systems according to various embodiments of the invention. Embodiments of the invention transition the prior art approach of assembly and installation at single location sites to a centralized and coordinated assembly factory that allows a more cost-effective and dynamic process of constructing large-scale solar systems. This centralized assembly of solar system components, such as solar tables, necessitates transportation of the assembled solar tables to installation site. Once the assembled solar table is at the installation point, integration of the solar table may require access to certain portions of the solar table and removal or adjustment of clamps securing components within the solar table. Additionally, the installation of these pre-assembled components may require functionality to support the alignment and integration of these components into the system.

Resources are brought to a construction site 201 for a large-scale solar systems and initially processed. These resources are delivered to one or more assembly factories 202 where a coordinated and centralized solar table assembly process is performed. In certain embodiments, a construction site may have multiple centralized factories 202. As shown in FIG. 2, there are two centralized factories 202 strategically located at the site. The location and number of centralized factories 202 may depend on several parameters including the size of the site, the terrain of the site, the design of the site and other variables that relate to the construction of the large-scale solar system.

Assembled solar tables and equipment are moved from a factory 202 to a point of installation 220 via motorized vehicles 210 such as a mobile transport. Once at the point of installation 220, the torque tube within the solar table needs to be secured to a neighboring torque tube. However, unlike prior art systems where the entire solar panel is assembled at the point of installation 220 and the torque tube connection are made prior to securing solar panels within the solar table, an assembled solar table with solar panels coupled to the torque tube is delivered. This delivery of an assembled solar table presents a unique problem to the installation process in that solar panels or other components within the solar table may block access to areas of the torque tube needed to secure the solar table to a neighboring torque tube. Embodiments of the present invention address this issue by providing clamps that sufficiently secure solar panels to the torque tube so that the solar table may be transported to the installation site while also providing personnel a relatively simple process of removing the clamp so access to an area of the torque tube is available during the installation process. One skilled in the art will recognize that a variety of different clamp embodiments may be used to achieve this desired result.

Figure 3:
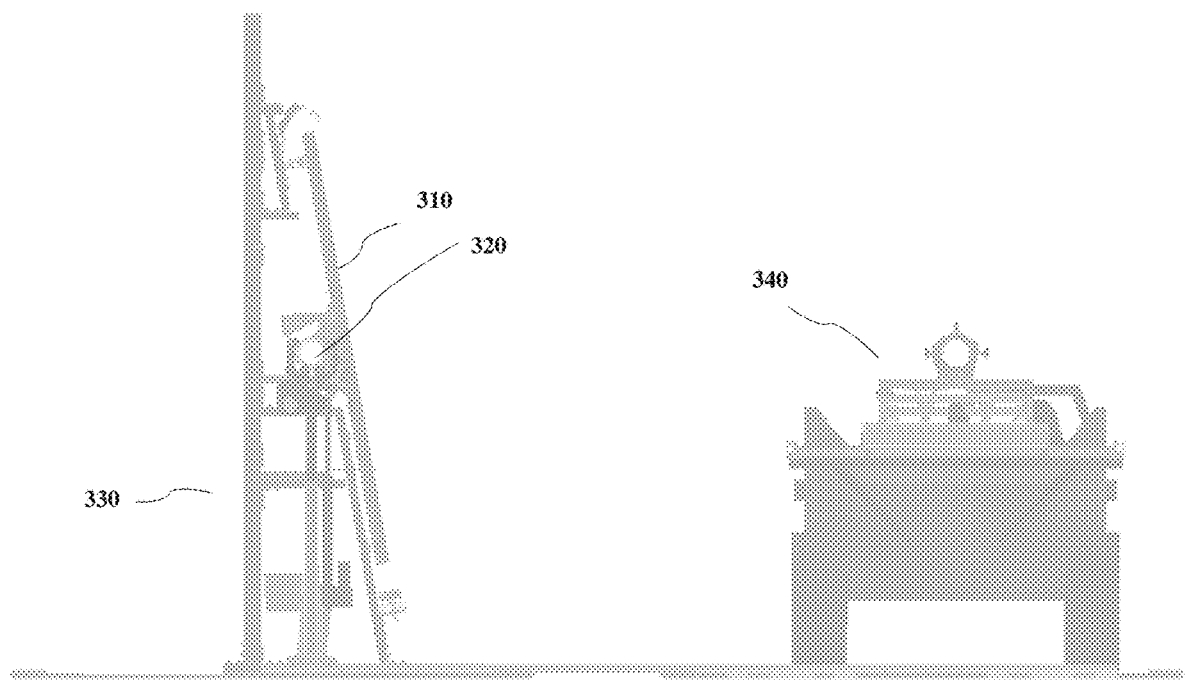
FIG. 3 illustrates an exemplary centralized solar table assembly according to various embodiments of the invention.

FIG. 3 illustrates a centralized assembly device and mobile transport according to various embodiments of the invention. As shown, a centralized assembly device 330 is provided where multiple solar tables are assembled. A mobile transport 340 delivers assembled solar panels to various installation points for integration into the solar panel system. As previously discussed, this centralized assembly 330 improves the efficiency, cost and adaptability of the installation of large-scale solar systems by implementing centralized assembly of solar tables. Each solar table includes a torque tube 320 and at least one solar panel 310 that is secured to the torque tube 320 using at least one clamp, embodiments of which are described in detail below.

Figure 4:
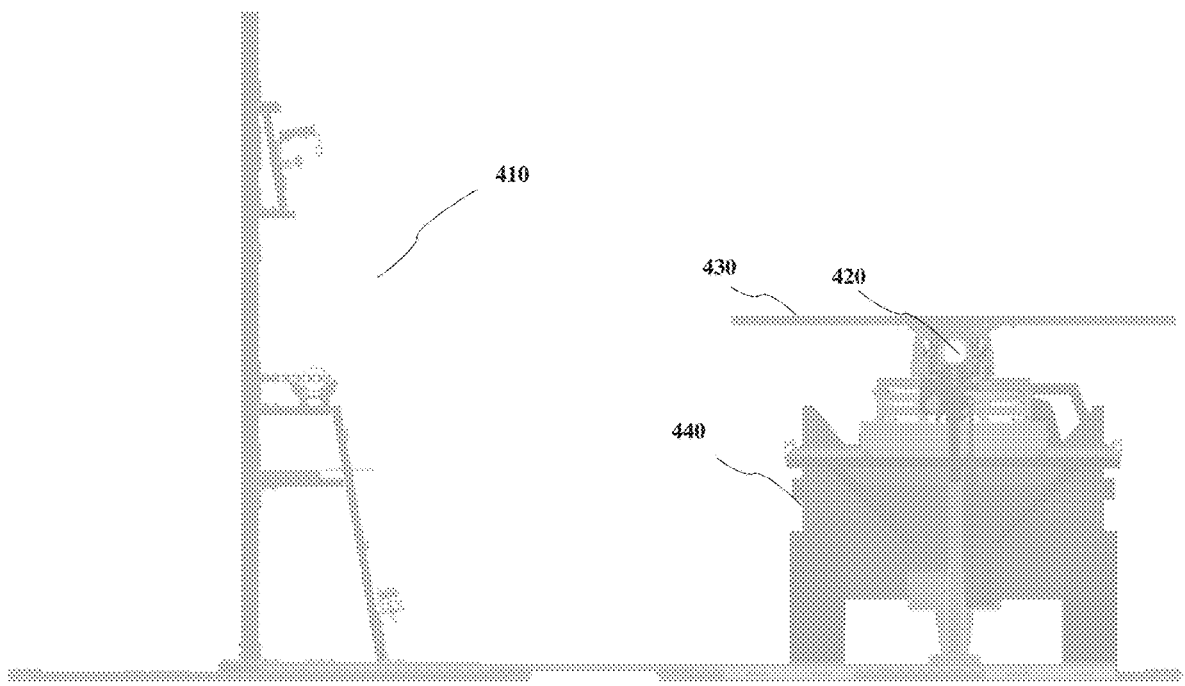
FIG. 4 illustrates is an assembled solar table that is moved from a centralized assembly device to a mobile transport according to various embodiments of the invention.

FIG. 4 illustrates an example of an assembled solar table being loaded onto a mobile transport according to various embodiments of the invention. As shown, the solar table is transitioned from the centralized assembly device 410 to a mobile transport 440. In this particular example, the solar table is moved away from the centralized assembly device 410 and rotated so that it rests horizontally on the mobile transport 440. One skilled in the art will recognize that the solar table may be transitioned from the centralized assembly device 410 to mobile transport 440 in a number of different methods and may reside on the mobile transport 440 in a variety of different positions.

The transition of the solar table from the centralized assembly device 440 to the mobile transport 440 requires that the solar panel(s) 430 are properly secured to the torque tube 420. In addition, this clamp between the solar panel(s) 430 and the torque tube 420 must also be sufficiently secure to enable the mobile transport to deliver the solar table to an installation point across a variety of different terrain including uneven and bumpy terrain. The clamp should also be structurally designed to enable personnel to efficiently remove the clamp at the installation point so that a portion of the torque tube 420 is accessible for integration into the solar panel system. For example, integration of the solar panel may be secured to a previously installed table whereby the torque tube 420 is inserted into a previously installed table. The clamp stabilizes and guides the solar panel such that installation personnel can integrate the previously constructed solar table into the system at the installation point. The previously installed table may be secured to a pile where threaded fasteners/rivets connect its bearing housing assembly/brackets to the pile. These processes may require access to certain portions of the torque tube 420 that may be covered or blocked by clamps or other attachments to the solar panel(s) 430. Embodiments of the invention disclose various clamps that provide a secure attachment between the torque tube 420 and the solar panel(s) 430 while also facilitating efficient removal of the clamp to allow access to a portion of the tube for integration into the solar panel system.

Figure 5A:
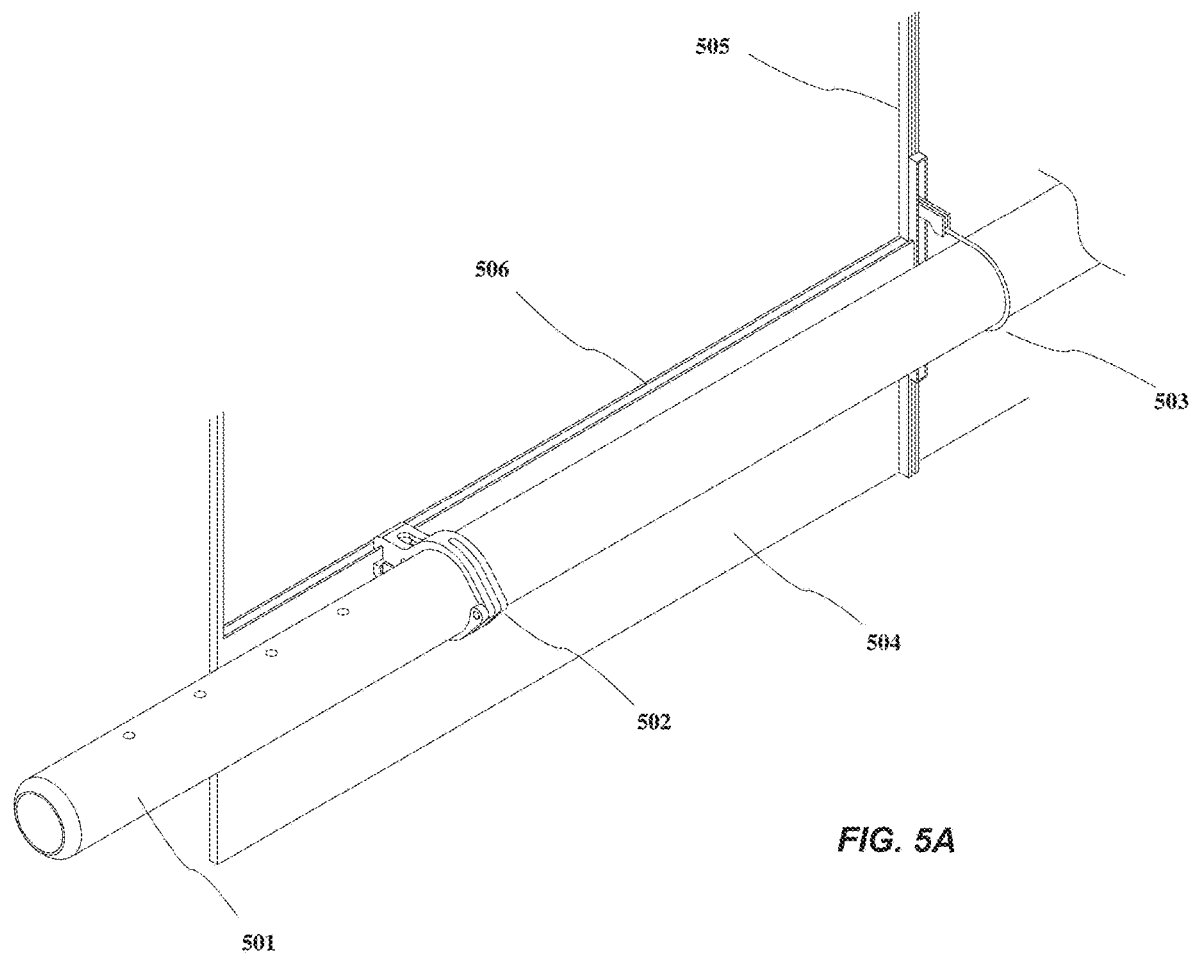
FIG. 5A is a view of a solar table having a long-term attachment between a torque tube and a solar panel and a solar clamp coupling the torque tube to the solar panel according to various embodiments of the present invention.

FIG. 5A illustrates a torque tube and solar panel that are secured together by a long-term attachment and a clamp in accordance with various embodiments of the invention. One skilled in the art will recognize that the clamp 502 temporarily couples the torque tube 501 to a rail 506 of a solar panel 504 to enable transportation of the solar table to an installation point and also allows an efficient removal of the clamp by adjusting a locking mechanism. Once at the point of installation, the clamp 502 may be efficiently removed using a locking mechanism to remove or adjust the clamp 502 for integration into the system by installation personnel. In certain instances, the clamp 502 is no longer used once the solar table is fully installed into the solar panel system.

The long-term attachment 503 secures the torque tube 501 to the solar panel 504 (in this example, specifically to a frame 505 of the solar table 501) over a long period of time. The long-term attachment 503 requires components such as bolts or other long-term attachment components that requires effort by personnel to remove the attachment resulting in a more time-consuming process of removing the long-term attachment 503 relative to the clamp 502. In most instances, the long-term attachment 503 remains within the solar table after an installation process is completed.

One skilled in the art will recognize that the clamp 502 may couple to the solar panel at a variety of different locations (e.g., rail and/or frame) and the long-term attachment 503 may also be secured to the solar panel at a variety of different locations.

Figure 5B:
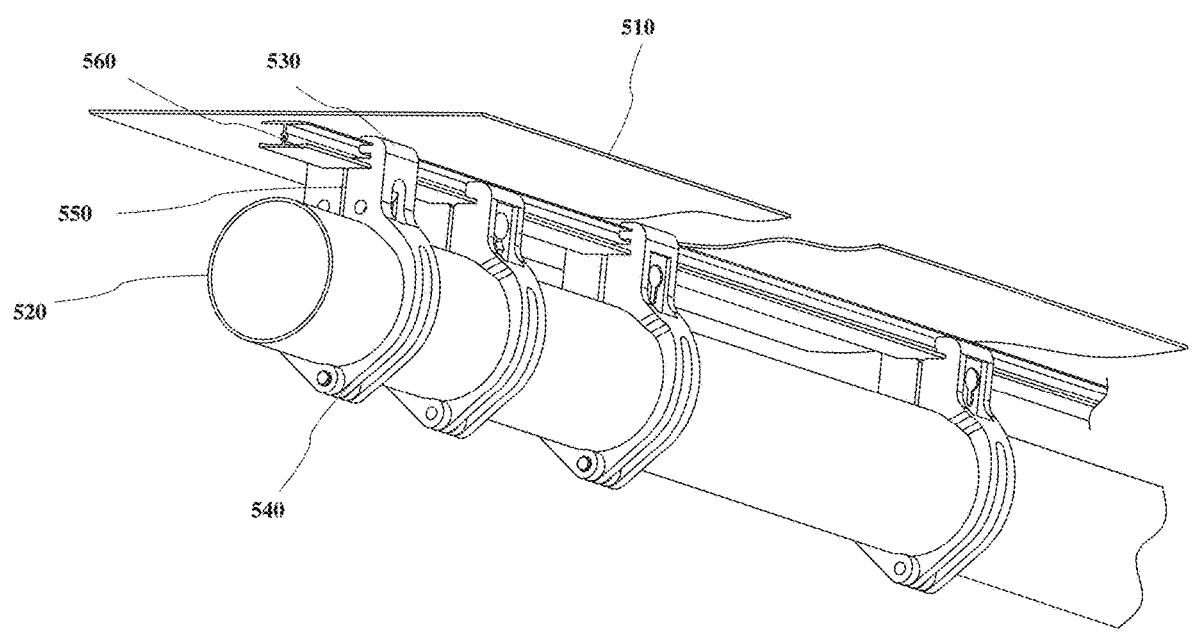
FIG. 5B is a first view of a solar table having multiple clamps that couple two solar panels to a torque tube that enables transport of the solar table to a remote installation point in accordance with various embodiments of the present invention.

FIG. 5B illustrates a focused view of a torque tube and solar panels that are attached using multiple clamps according to various embodiments of the invention. A solar panel 510 is coupled to a torque tube 520 using multiple clamps. In one example, the clamp has a torque tube attachment section 540 that wraps around the torque tube 520 and a solar panel attachment section 530 that couples to the solar panel by attaching to a rail 560. In this example, the solar panel attachment section 530 comprises at least one slot that couples to the rail on the base of the solar panel 510. The clamp also comprises a locking mechanism 550 that may be efficiently locked and unlocked to open the clamp or securely close the clamp.

One skilled in the art will recognize that this embodiment of the clamp allows the solar panel 510 to be attached to the torque tube 520 and safely transported from a central assembly device to an installation point. The clamp also allows personnel to efficiently release the clamp at the installation point to get access to a portion of the torque tube needed for long-term integration into the solar panel system. One skilled in the art will also recognize that a variety of clamp designs may be implemented having solar panel attachment and torque tube attachment sections and a locking mechanism that fall within the scope of the present invention some of which are described below.

Figure 6:
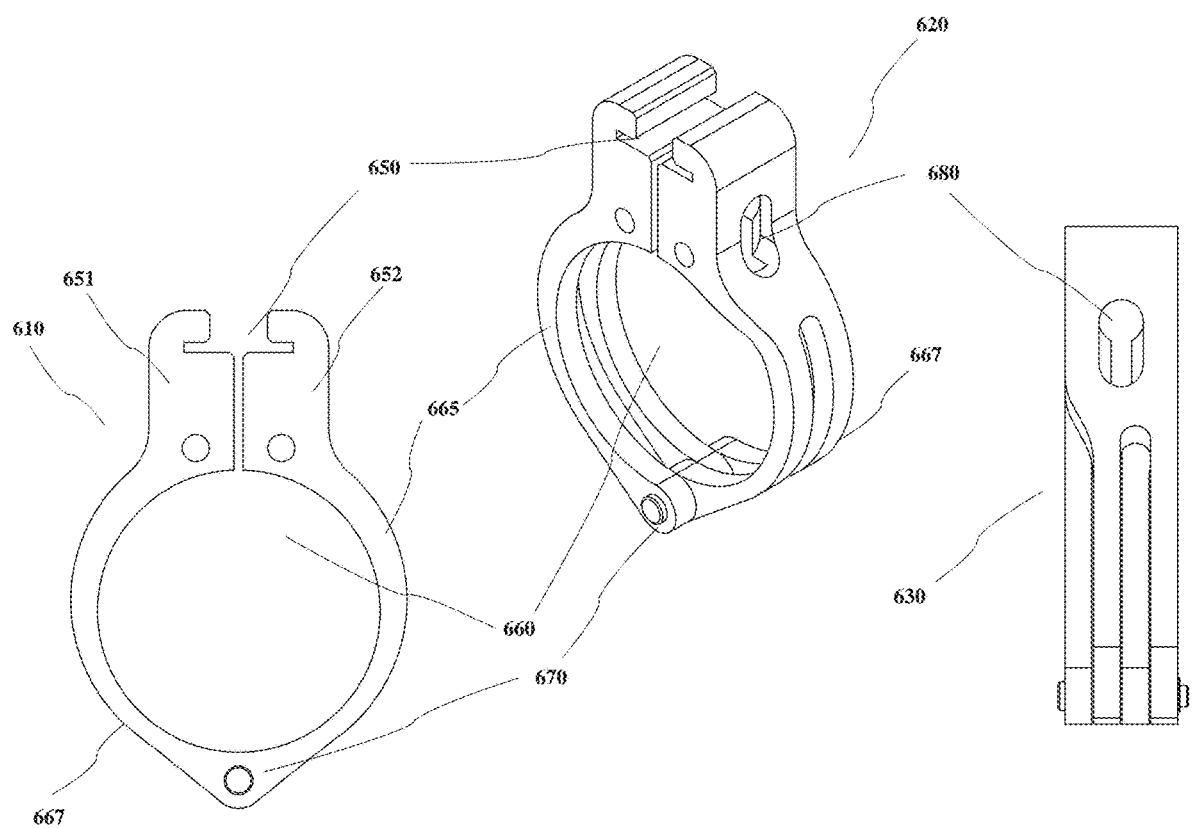
FIG. 6 illustrates multiple views of a first clamp in accordance with various embodiments of the present invention.

FIG. 6 shows multiple views of a first embodiment of a clamp according to various embodiments of the invention. In this example, a front view 610, a side view 630 and an angled view 620 are provided to show a specific embodiment of the invention. This particular clamp comprises a torque tube attachment section 660, a solar panel attachment section 650 and a locking mechanism 680.

The torque tube attachment section 660 comprises a first tube coupling element 665 and a second tube coupling element 667 that can form a circular opening in which a torque tube may be secured. The first torque tube coupling element 665 and the second torque tube coupling element 667 move relative to an axis 670 that allows the clamp to open and close around the torque tube. This circular opening provides a sufficiently secure attachment to the torque tube to allow transportation of the solar table but also allows personnel to efficiently release the clamp at an installation point within the large-scale solar panel system. One skilled in the art will recognize that the size and shape of the torque tube attachment section 660 may vary across different embodiments of the invention, all of these provide a secure coupling around the torque tube to allow transportation of a corresponding solar table.

The solar panel attachment section 650 comprises a first solar panel coupling element 651 and a second solar panel coupling element 652, both of which comprise a partial slot section that forms a coupling slot when the clamp is closed. This coupling slot can be secured to a rail under the solar panel when the clamp is closed and allows the solar panel to be removed when the clamp is open. One skilled in the art will recognize that the size and shape of the solar panel attachment section 650 may vary across different embodiments of the invention, all of these provide a secure coupled to a rail under a solar panel to allow transportation of the corresponding solar table.

The locking mechanism 680 provides a structure that locks the clamp in a closed position, which results in coupling the solar panel and the torque tube, and that unlocks the clamp which allows personnel to remove or adjust the clamp. In this example, the locking mechanism 680 uses a locking bolt that allows the clamp to be opened when the bolt is positioned within an upper window and locked when the bolt is lowered into a lower window (that has a smaller opening) such that the clamp secures the solar panel and the torque tube together. One skilled in the art will recognize that the size and shape of the locking mechanism 680 may vary across different embodiments of the invention, all of these provide a mechanism to secure the clamp within a closed position and also allow the clamp to be removed or adjusted within an open position.

The functions associated with the torque tube attachment section, the solar panel attachment section and locking mechanism may be realized by a large number of different implementations, all of which fall within the scope of the present invention. A few examples of different structural embodiments are provided below, which are intended to be exemplary and not a complete list of implementations of the present invention.

Figure 7:
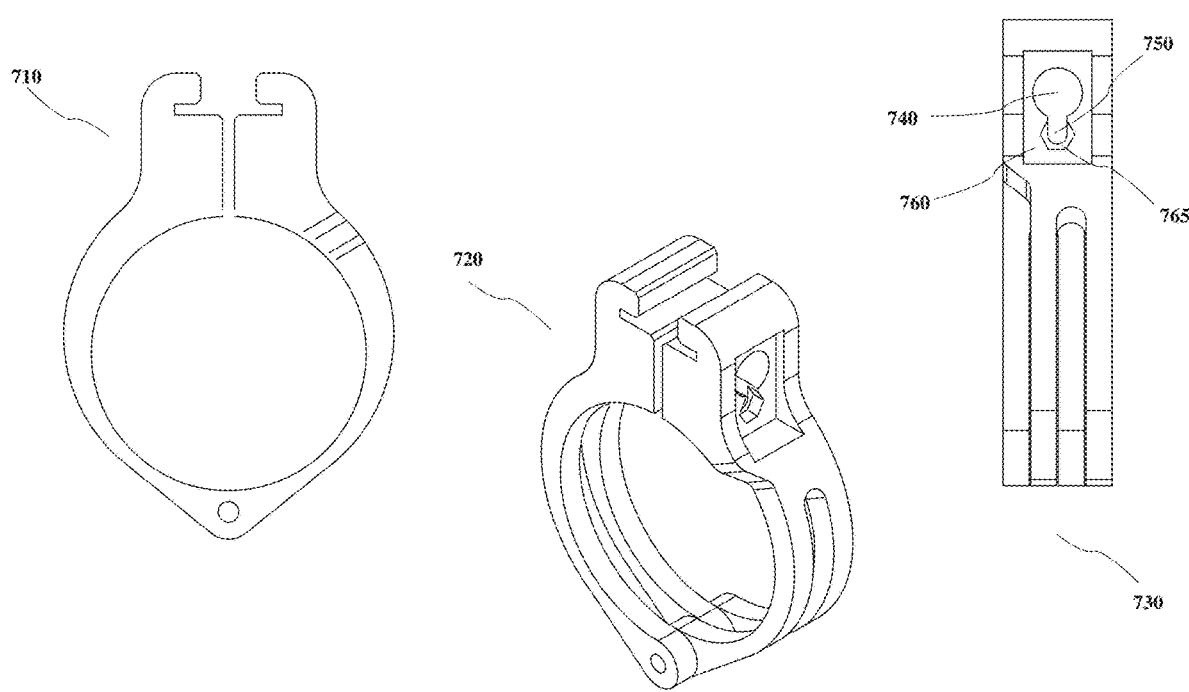
FIG. 7 illustrates multiple views of a second clamp in accordance with various embodiments of the present invention.

FIG. 7 illustrates a second embodiment of the clamp in accordance with various embodiments of the invention. This embodiment shows a specific structure associated with the locking mechanism of the clamp. The figure shows a front view 710 of the clamp, a side view 730 of the clamp and an angled view 720 of the clamp. The torque tube attachment section and solar panel attachment section function in a manner consistent with their functions described in FIG. 6.

In this particular example, the locking mechanism comprises an upper window 740 and a lower window 750, and has an outer surface that comprises a flat surface 760 and a sunken surface 765 that correlates to a head of a locking bolt. The opening within the upper window 740 is larger than the opening in the lower window 750, which allows a locking bolt to slide through the upper window 740 but not the lower window 750. Accordingly, in this particular embodiment, the clamp is closed and secured when the locking bolt is positioned within the lower window 750 and sufficiently tight against the sunken surface 765 and within the lower window 750. If personnel desire to open the clamp, then the locking bolt is twisted to a loose position and lifted into the upper window 740. Once in the upper window 740, the head of the locking bolt may move through the upper window 740 resulting in the clamp being opened such that it can be adjusted around or removed from the torque tube.

Figure 8:
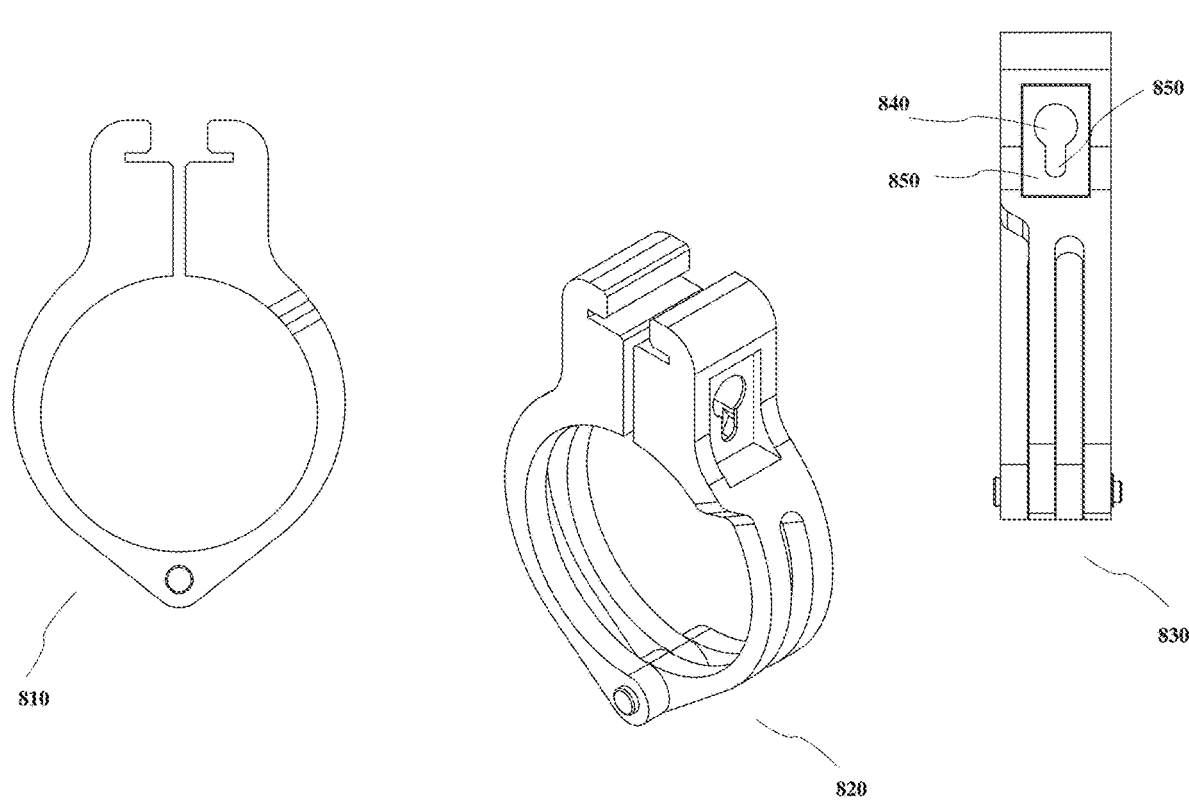
FIG. 8 illustrates multiple views of a third clamp in accordance with various embodiments of the present invention.

FIG. 8 illustrates a third embodiment of the clamp in accordance with various embodiments of the invention. This particular embodiment shows another specific structure associated with the clamp. The figure shows a front view 810 of the clamp, a side view of the clamp 830 and an angled view 820 of the clamp. The torque tube attachment section and the solar panel attachment section function in a manner consistent with their function described in FIG. 6.

In this particular example, the locking mechanism comprises an upper window 840 and a lower window 850 and has a single flat surface against which the locking bolt is securely positioned. The upper window 840 and the lower window 850 functionally operate consistent with the description of FIG. 7. However, this particular embodiment has a singular flat surface against which the locking bolt is positioned. In some circumstances, this locking mechanism surface may be preferable in that it is easier to manufacture and simpler to construct.

Figure 9:
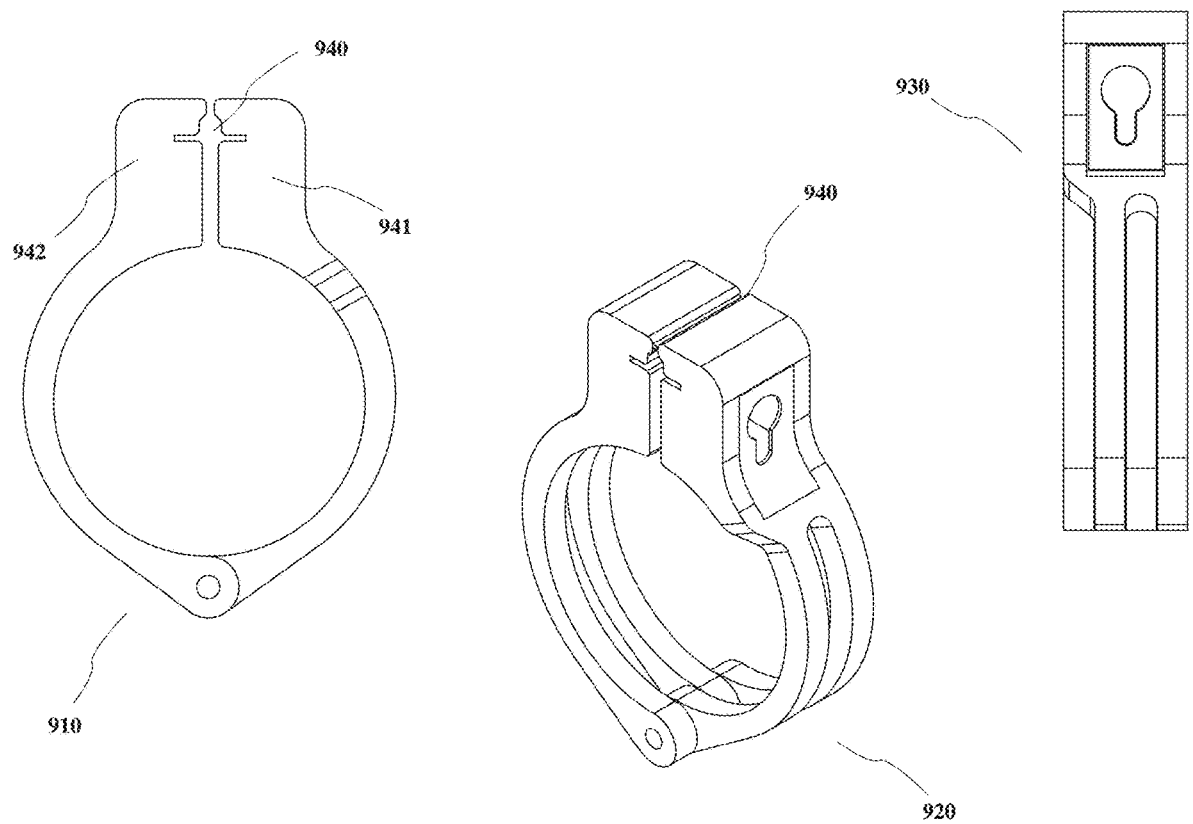
FIG. 9 illustrates multiple views of a fourth clamp in accordance with various embodiments of the present invention.

FIG. 9 illustrates a fourth embodiment of the clamp in accordance with various embodiments of the invention. This particular embodiment shows another specific structure associated with the clamp. The figure shows a front view 910 of the clamp, a side view of the clamp 930 and an angled view 920 of the clamp. The torque tube attachment section functions in a manner consistent with its function described in FIG. 6 and the locking mechanism may function consistent with at least one of the functions described in FIGS. 6-8.

The solar panel attachment section comprises a first solar panel coupling element 941 and a second solar panel coupling element 942, both of which comprise a partial slot section that forms a coupling slot 940 when the clamp is closed. This coupling slot 940 can be secured to a rail under the solar panel when the clamp is closed and allows the solar panel to be removed when the clamp is open. One skilled in the art will recognize that this coupling slot 940 provides a longer top section that is secured around the rail under the solar panel when compared to the coupling slot described in FIG. 6. This coupling slot 940 may provide a stronger attachment to the rail and may be more specifically designed to a particular rail.

Figure 10:
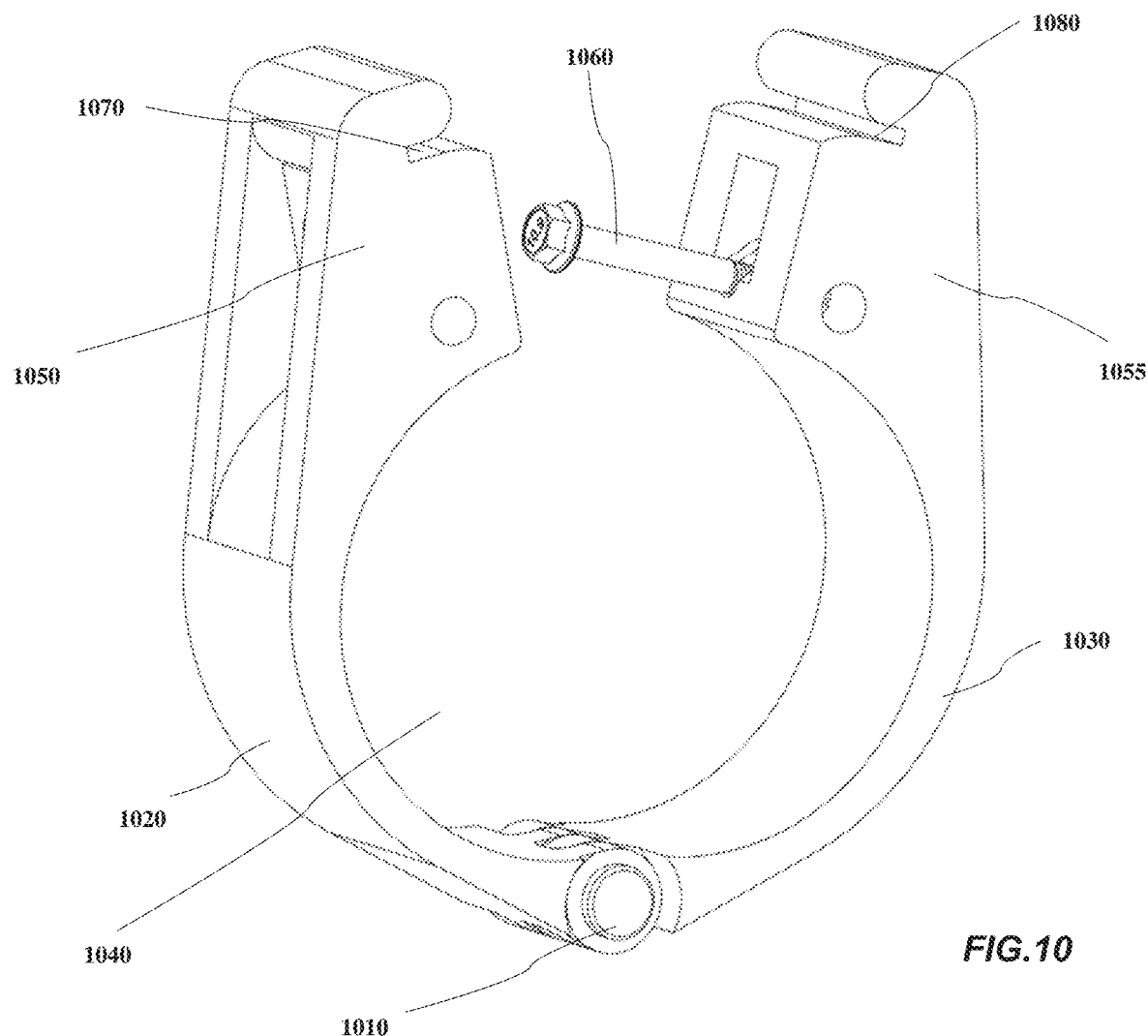
FIG. 10 illustrates a front view of an opened clamp in accordance with various embodiments of the present invention.

FIG. 10 illustrates an open clamp in accordance with various embodiments of the invention. The clamp comprises a torque tube attachment section having a first torque tube coupling element 1020 and a second torque tube coupling element 1030 that form an opening 1040 in which a torque tube may be positioned. A rotatable axis 1010 allows the first and second torque tube elements 1020, 1030 to be moved away from each other to allow the clamp to be removed from the torque tube or adjusted on the torque tube. In this example, the rotatable axis 1010 comprises a bolt positioned at the base of the clamp that facilitates this movement.

The clamp further comprises a solar panel attachment section comprising a first solar panel coupling element 1050 and a second solar panel coupling element 1055. The first solar panel coupling element 1050 comprises a first partial slot section 1070 and the second solar panel coupling element 1055 comprises a second partial slot section 1080. When the clamp is in a closed position, the first and second partial slot sections 1070, 1080 form a slot in which a rail on the solar panel may be secured. When the clamp is in an open position, the first and second partial slot sections 1070, 1080 are separated by a distance that allows the rail (and corresponding solar panel) to be removed from the clamp.

The locking mechanism comprises a locking bolt 1060 that allows personnel to open and close the clamp. The locking bolt 1060 may be initially secured within the locking mechanism using a nut so that the threaded end of the locking bolt may be screwed into place. Once in place, the locking bolt 1060 may be moved between a plurality of windows to lock, loosen or remove the clamp. In this example, the locking bolt 1060 may reside in one of two windows. If the locking bolt 1060 is in a lower window and tightened, then the clamp is closed. If the locking bolt 1060 is positioned in an upper window (which has a larger opening than the lower window), then the locking bolt head may be moved through the upper window resulting in the clamp opening. In certain embodiments, the locking mechanism comprises a sloped surface that allows the locking bolt 1060 to be guided between the two windows. As the clamp is being closed, the locking bolt 1060 is guided and inserted into the upper window and then locked in place when the locking bolt 1060 has transitioned through the upper window and subsequently moved into the lower window. One skilled in the art will recognize that the size and shape of the locking bolt 1060 may vary across different embodiments of the invention. One skilled in the art will also recognize that the size and shape of the upper window and lower window may vary across different embodiments of the invention.

Figure 11:
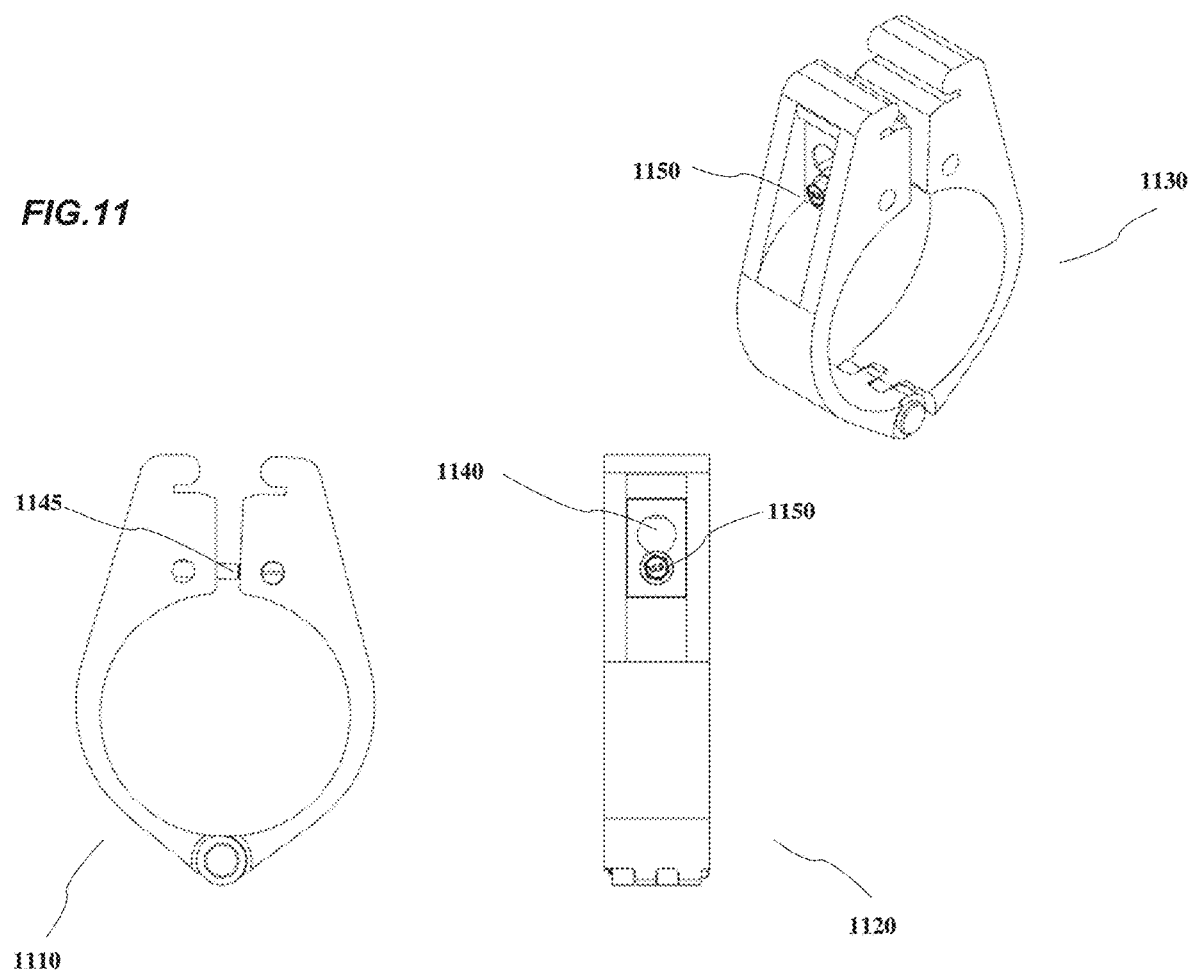
FIG. 11 illustrates multiple views of a closed clamp in accordance with various embodiments of the present invention.

FIG. 11 illustrates multiple views of a closed clamp according to various embodiments of the invention. This figure provides a front view 1110 of a clamp, a side view 1120 of the clamp and an angled view 1130 of the clamp in accordance with various embodiments of the invention. The closed clamp is tightly secured in the closed position by a locking bolt 1145 that results in the clamp coupling to a torque tube positioned within a circular opening and a rail on a solar panel positioned within a slot.

The closed clamp is secured in this position by the locking bolt 1145 being positioned within a lower window 1150 and tightened by rotating the locking bolt 1145 in a first direction. If personnel desire to open the clamp, the locking bolt may be loosened by rotating the locking bolt 1145 in a second direction which allows the locking bolt to be moved to the upper window 1140. Thereafter, the clamp may be opened by moving the locking bolt through the upper window which releases the clamp from the solar panel rail and the torque tube.

As mentioned above, embodiments of the clamp may be realized by a variety of different structural and functional implementations of the solar panel attachment section, the torque tube attachment section and/or the locking mechanism. To illustrate this scope of the invention, another example is provided in which these components are modified both structurally and functionally to release a different embodiment of the clamp.

Figure 12:
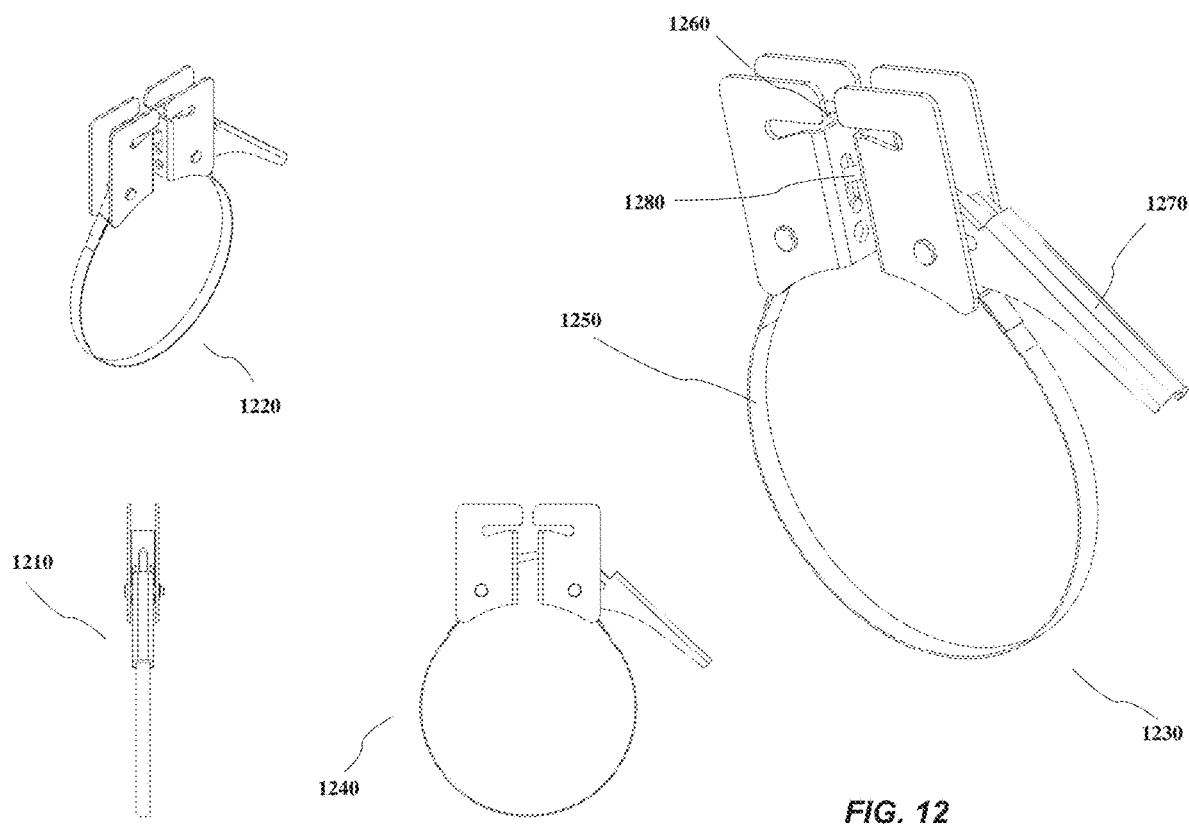
FIG. 12 illustrates multiple views of a fifth clamp in accordance with various embodiments of the present invention.

FIG. 12 illustrates multiple views of a fifth embodiments of a clamp in accordance with various embodiments of the invention. These figures show a front view 1240 of the clamp, a side view of the clamp 1210, a first angled view 1220 of the clamp and a second angled view 1230 of the clamp. In this example, the torque tube attachment section comprises a strap 1250 that wraps around a torque tube. This strap 1250 may be made of flexible metallic material, a fiber material or any other type of material that provides sufficient flexibility to allow it to wrap around the torque tube and is sufficiently strong to secure the torque tube in a preferred position.

The solar panel attachment section comprises a first solar panel coupling element and a second solar panel coupling element that move relative to each other via a locking element 1280. Each of these elements comprises partial slits that may couple or de-couple from a rail on a solar panel based on their proximity to each other.

The distance between the first and second solar panel coupling elements is based on the state of the locking mechanism. The locking mechanism comprises a locking element 1280 that is controlled by personnel using a lever 1270 that moves this locking element 1280 back and forth. This locking mechanism may be efficiently used by personnel at either a centralized assembly location or an installation point within a large-scale solar system.

Figure 13:
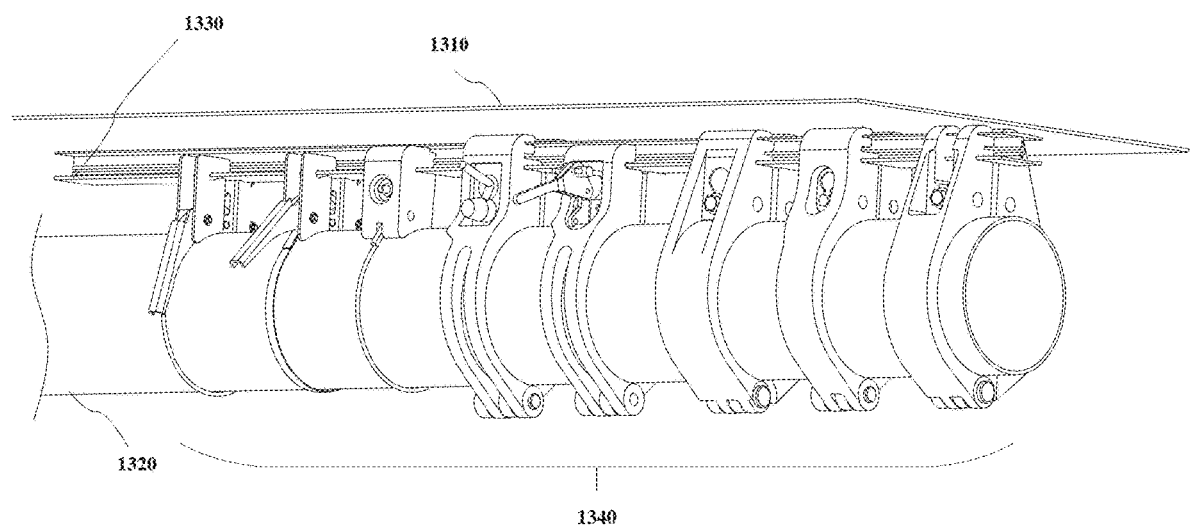
FIG. 13 illustrates examples of different embodiments of a clamp in accordance with various embodiments of the present invention.

FIG. 13 illustrates a variety of examples of a clamp according to various embodiments of the invention. As shown, each of the clamp examples 1340 couples a torque tube 1320 to a rail 1330 of a solar panel 1310. Each of these clamps 1340 comprises a solar panel attachment section, a torque tube attachment section and a locking mechanism. These exemplary clamps 1340 secures the solar panel 1310 (via a rail 1330) to a torque tube 1320 that allows transportation of a solar table from a centralized assembly location to an installation point while also allowing installation personnel the ability to efficiently remove or adjust the clamp during an installation process. One skilled in the art will recognize that other embodiments, each having a solar panel attachment section, a torque tube attachment section and a locking mechanism, may be realized in accordance with various embodiments of the invention.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A clamp that couples to a torque tube and a solar panel rail within a solar table, the clamp comprising:
a solar panel attachment section comprising a first solar panel coupling element and a second solar panel coupling element, the first and second solar panel coupling elements form a slot that couples to the solar panel rail when the first and second solar panel coupling elements are proximate to each other within a first distance;
a torque tube attachment section comprising a first torque tube coupling element and a second torque tube coupling element, the first and second torque tube coupling elements form an opening in which a torque tube is positioned; and
a locking bolt that allows the clamp to be opened when the locking bolt is positioned within an upper window and locked when the locking bolt is lowered into a lower window.

2. The clamp of claim 1 the upper window being larger than the lower window.

3. The clamp of claim 2 wherein the clamp is closed when the locking bolt is positioned within the lower window and tightened.

4. The clamp of claim 2 wherein the clamp is open when the locking bolt is moved through the upper window resulting in proximity of the first and second solar panel coupling elements are at a distance greater than the first distance.

5. The clamp of claim 2 wherein an outer surface associated with the lower window is sunken to align with a head of the locking bolt in response to tightening the locking bolt.

6. The clamp of claim 1 wherein the locking bolt unlocks the clamp in an open position that allows the clamp to be removed from the torque tube and the solar panel rail.

7. The clamp of claim 1 wherein the locking bolt unlocks the clamp in an open position that allows the clamp to be adjusted along the torque tube.

8. The claim of claim 1 wherein a first position of the first solar panel coupling element and a second position of the second solar panel coupling element are controlled by the locking bolt.

9. The clamp of claim 1 wherein the first and second torque tube coupling elements move relative to an axis point.

10. The clamp of claim 9 wherein the axis point is located proximate to a base of the clamp.

11. The clamp of claim 9 wherein the axis point comprises a bolt the couples the first and second torque tube coupling elements and facilitates movement around the axis point.

12. The clamp of claim 1 wherein the first solar panel coupling element comprises a first partial slot and the second solar panel coupling element comprises a second partial slot.

13. The clamp of claim 12 wherein the first and second partial slots have an equal size.

14. The clamp of claim 1 wherein the solar table is transported from a centralized assembly location to an installation point after the clamp is locked in a closed position.

15. The clamp of claim 14 wherein the clamp is opened after the solar table has arrived at the installation point.

\* \* \* \* \*